C. STEPHENS.
TRACTION TIRE.
APPLICATION FILED AUG. 29, 1908.
924,701.
Patented June 15, 1909.
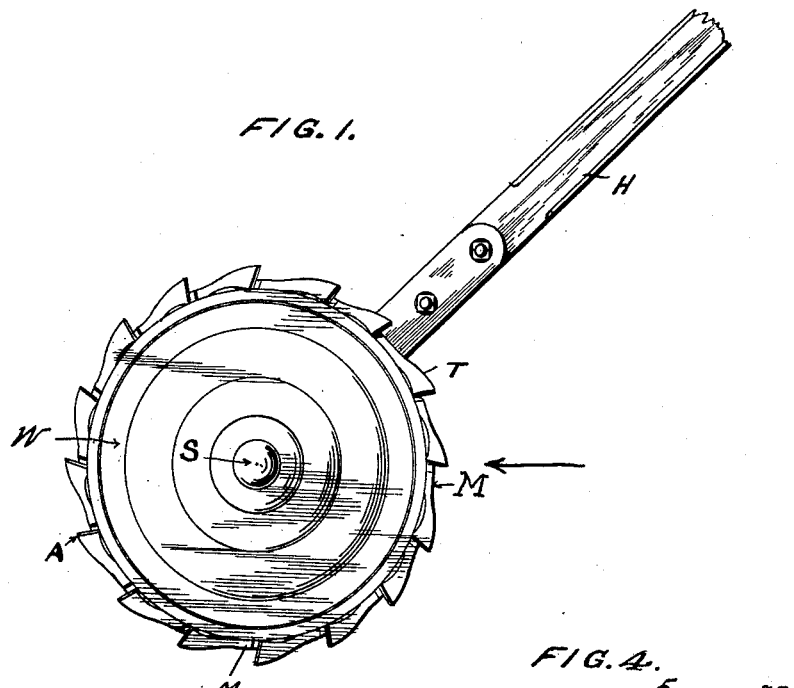
FIG. 1.
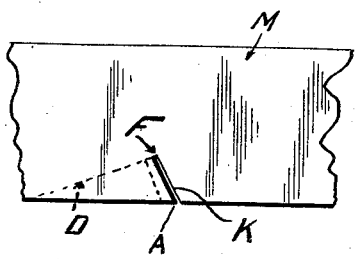
FIG. 2.
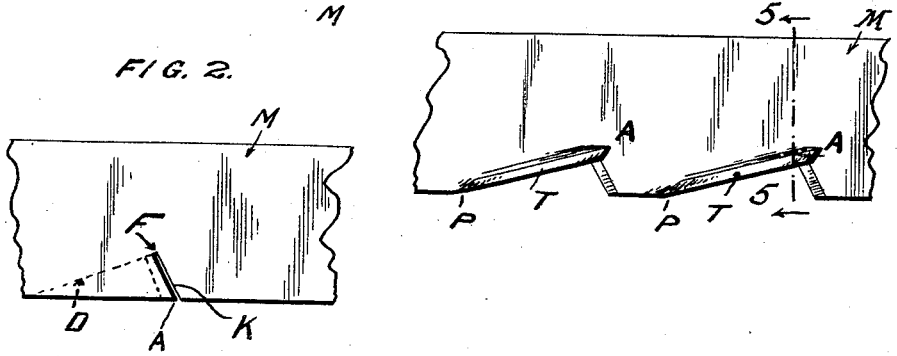
FIG. 4.
FIG. 3.
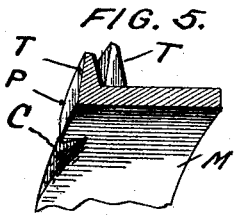
FIG. 5.
WITNESSES:
Chas. K. Davies
Edith L. Smith
INVENTOR:
Clark Stephens
Collamer & Co., Attorneys.

UNITED STATES PATENT OFFICE.

CLARK STEPHENS, OF PINKSTAFF, ILLINOIS.

TRACTION-TIRE.

No. 924,701.  Specification of Letters Patent.  Patented June 15, 1909.

Application filed August 29, 1908. Serial No. 450,863.

*To all whom it may concern:*

Be it known that I, CLARK STEPHENS, a citizen of the United States, and resident of Pinkstaff, Lawrence county, State of Illinois, have invented certain new and useful Improvements in Traction-Tires; and my preferred manner of carrying out the invention is set forth in the following full, clear, and exact description, terminating with claims particularly specifying the novelty.

This invention relates to traction wheels in the class of carriages and wagons, and more particularly it is a tire adapted for use on the driving wheels of lawn mowers and the like to prevent them from slipping. It is well known that when such machines are driven along a side hill they often slip laterally out of the path through which it is desired they shall travel. It is also well known that the cutting mechanism on a lawn mower is driven at a high rate of speed by its supporting wheels, and especially where the grass is coarse or dense the resistance afforded frequently causes said wheels to slip rather than to turn as they must in order to drive the cutting mechanism.

One object of this invention is to produce a traction wheel—or a tire which may be applied to the rim of an ordinary wheel—that will avoid such slipping both laterally and longitudinally.

To these ends the invention consists specifically in the traction wheel tire hereinafter more fully described and claimed, and shown in the accompanying drawings wherein—

Figure 1 is a side elevation of a portion of a lawn mower with my improved traction tire applied to its nearest wheel; Fig. 2 is a plan view of the tire showing the initial cut for making a tooth and Fig. 3 is an edge view thereof. Fig. 4 is a plan view of a section of the tire showing two of the teeth as bent upward; and Fig. 5 is a section on the line 5–5 of Fig. 4.

In the drawings the letter H designates the handle of a lawn mower whose machinery further than this is not illustrated, and S the main shaft on which is mounted the wheels W of which only the nearest one is shown. These wheels may be of iron with a metal rim, and the rim itself may be treated as hereinafter described; they may be of wood or other material, and the tire described below can be shrunk or otherwise secured around them; or they may, in fact, be of metal, and the tire below can be shrunk or otherwise secured thereon. The details thus far described form no part of the present invention, and are illustrated and described to bring out the preferable use of my improved traction tire. This tire M is made from a strip of metal such as iron, preferably about an inch wide and one eighth of an inch thick. Along one edge, which is to be the outer edge or corner of either wheel, are first cut kerfs K as by the use of a cold chisel, as seen in Figs. 2 and 3.

Transversely of the metal strip each kerf inclines forward laterally to its front end F so that the kerf occupies an oblique position when seen in plan view, and radial of the complete tire each kerf inclines forward toward its inner edge I as seen in Fig. 3, so that when viewed in plan it appears to be undercut. That part of the metal at the edge of the strip M which is bounded by the acute angle formed by the kerf is then bent upward or radially outward on the dotted line D of Fig. 2 so as to produce triangular teeth T as seen in Fig. 4, each extending from a point P coincident with the outer edge of the strip M obliquely rearward and inward to the point A which is the acute angle formed by the kerf K. In so bending the teeth outward their bodies and their rear undercut ends are made to stand in a plane at right angles to the strip M at that point, and their rear ends from the points A to F will be inclined to the rear around the wheel to just the extent that the kerf K was inclined forward when it was cut. Said rear ends will also be slightly beveled to just the extent that said kerf was undercut. Finally, I preferably swage the teeth so that they are a little thinner along their outer edges than at their inner edges where their bodies merge into the strip M on the curved line C, although this I do not consider essential.

A traction tire as thus constructed is attached to or shrunk on each wheel W of the lawn mower, with the teeth along its outer corner as shown in Fig 1, and at each revolution of the wheel the thinner edges of the teeth embed the sod to an extent dependent upon the weight of the machine and the vigor with which it is propelled—thereby preventing lateral slipping. It is obvious that a forward impulse on the handle H pushes the machine both downward and forward and more deeply embeds the teeth whose wider beveled ends therefore cut into the sod and prevent slipping of the wheels under the resistance set up by the machinery which is driven thereby. Each tooth engages the earth first at its narrower end and leaves it at its wider end as will be clear.

If it is preferred to have its rear edge flat, the kerf K will not be undercut as shown at I. If it is preferred to have its rear end strictly radial to the wheel, the kerf K will not be inclined forward but will be cut straight across the strip M.

Either modification of the structure may be employed without the other, but I consider the preferred form of this tire to be that shown and described.

What is claimed as new is:

1. A traction tire consisting of a metal strip having integral triangular teeth cut from one of its edges and each bent outward from it into a plane substantially at right angles to the axis of the tire.

2. A traction tire consisting of a metal strip having integral triangular teeth cut from one of its edges and each bent outward from it into a plane substantially at right angles to the axis of the tire, the lines of the bends being and the teeth standing oblique to the line of travel.

3. A traction tire having radially projecting teeth extending nearly in a line with each other around its periphery with their rear ends beveled.

4. A traction tire having radially projecting teeth extending nearly in a line with each other around its periphery with their rear ends inclined outward to the rear of a radius.

5. A traction tire having radially projecting teeth extending nearly in a line with each other around its periphery with their rear ends beveled and inclined outward to the rear of a radius.

6. A traction tire having triangular teeth bent outward from one of its edges at their wider ends and merging into said edge at their narrower ends.

7. A traction tire having triangular teeth bent outward from one of its edges at their wider ends and merging into said edge at their narrower ends, their bodies growing thinner from their bends to their outer edges.

8. A traction tire having triangular teeth bent outward from one of its edges at their wider ends and merging into said edge at their narrower ends, their rear ends being beveled.

9. A traction tire having triangular teeth bent outward from one of its edges at their wider ends and merging into said edge at their narrower ends, their rear ends being inclined to the rear of a radius.

10. A traction tire having triangular teeth bent outward from one of its edges at their wider ends and merging into said edge at their narrower ends, their bodies growing thinner from their bends to their outer edges and their rear ends being beveled.

11. A traction tire having triangular teeth bent outward from one of its edges at their wider ends and merging into said edge at their narrower ends, their bodies growing thinner from their bends to their outer edge and their rear ends being inclined to the rear of a radius.

12. A traction tire having triangular teeth bent outward from one of its edges at their wider ends and merging into said edge at their narrower ends, their bodies growing thinner from their bends to their outer edges and their rear ends being beveled laterally and inclined radially to the rear of a radius.

In testimony whereof I have hereunto subscribed my signature this the 14th day of August, A. D. 1908.

CLARK STEPHENS.

Witnesses:
 M. H. BOWMAN,
 R. H. EMMONS.